Figure 1:
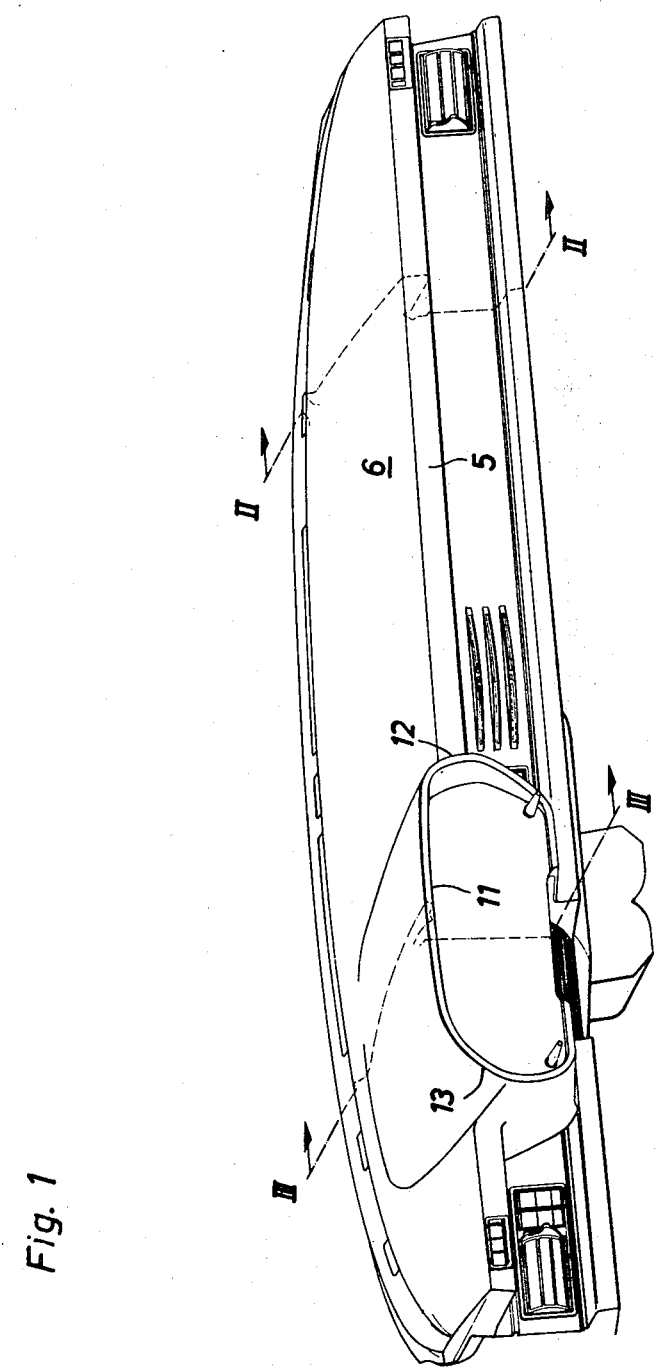

United States Patent
Behles

[11] 3,709,139
[45] Jan. 9, 1973

[54] DEVICE FOR SUPPLYING AIR INTO THE INTERIOR OF MOTOR VEHICLES

[75] Inventor: Franz G. Behles, Ingolstadt, Germany

[73] Assignee: Audi Nsu Auto Union Aktiengesellschaft, Ingolstadt, Germany

[22] Filed: Nov. 20, 1969

[21] Appl. No.: 878,400

[30] Foreign Application Priority Data

Nov. 27, 1968 Germany................P 18 11 286.2

[52] U.S. Cl................................................98/2.16
[51] Int. Cl. ..............................................B60h 1/24
[58] Field of Search................98/2.1, 2.4, 2.5, 2.6

[56] References Cited

UNITED STATES PATENTS

| | | | |
|---|---|---|---|
| 2,873,953 | 2/1959 | Thorne | 98/2.07 X |
| 3,103,155 | 9/1963 | Boylan et al. | 98/40 A |
| 3,319,560 | 5/1967 | Schaaf | 98/40 A |
| 3,329,078 | 7/1967 | DeCastelet | 98/2.07 |
| 3,382,791 | 5/1968 | Henry-Biabaud | 98/2.06 |
| 2,304,642 | 12/1942 | Hans | 98/2.4 X |

FOREIGN PATENTS OR APPLICATIONS

| | | | |
|---|---|---|---|
| 1,210,949 | 10/1959 | France | 98/2.4 |

*Primary Examiner*—Meyer Perlin
*Assistant Examiner*—W. C. Anderson
*Attorney*—Richards & Geier

[57] ABSTRACT

A device for supplying air into the interior of motor vehicles has an air tank located below the air flow and a substantially horizontal dashboard cover having an edge extending beyond the dashboard toward the interior of the vehicle. The dashboard is provided with air outlets. The device is particularly characterized by two air flow conduits connecting the air tank with the interior of the vehicle. These conduits open into the interior with nozzles located below the edge of the switch board cover.

1 Claim, 3 Drawing Figures

Inventor:
F. Behles

Inventor:
F. Behles

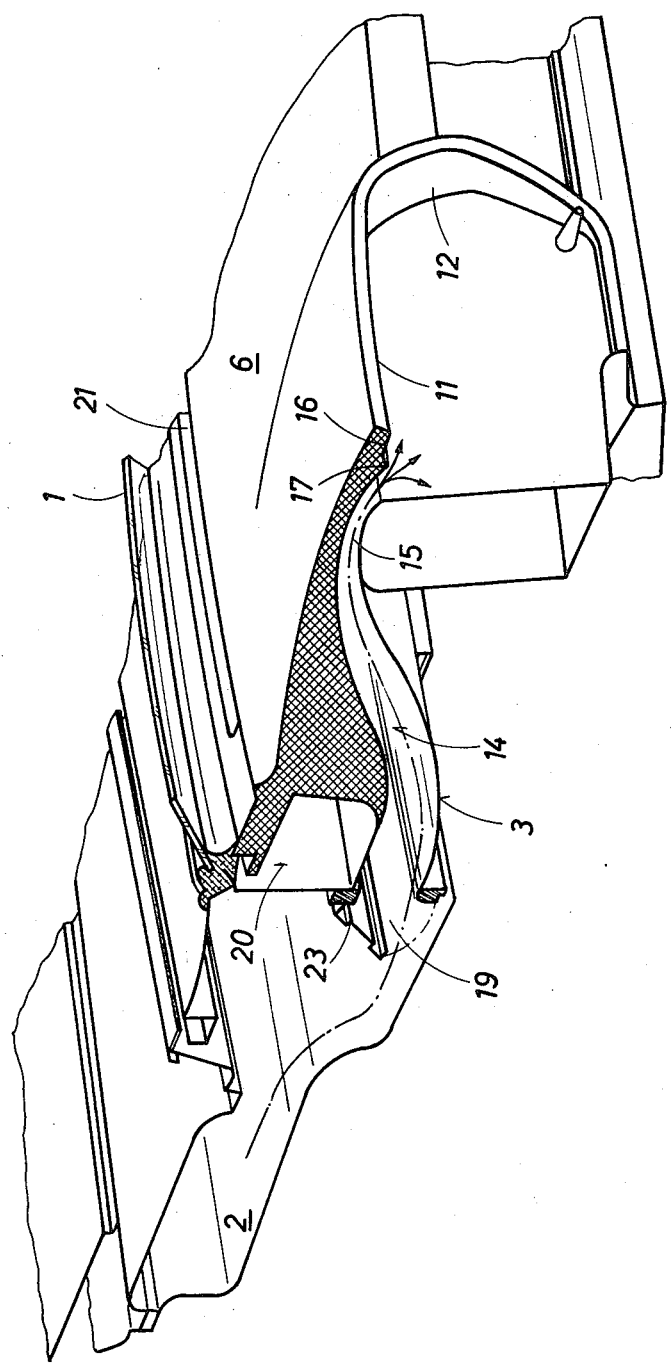

DEVICE FOR SUPPLYING AIR INTO THE INTERIOR OF MOTOR VEHICLES

This invention relates to a device for supplying fresh air into the interior of motor vehicles. The invention is particularly concerned with motor vehicles of the type having an air collecting tank below the air flow and a substantially horizontal dashboard cover having an edge extending beyond the dashboard in the direction toward the interior, the dashboard being provided with air outlet openings.

In known ventilation devices of this type air flows out of the tank, through hose or conduits into a dashboard carrier having the shape of a box and from there is guided through defrosting nozzles or other conduits to the windshield or to the side windows. Air flowing straight into the interior of the vehicle through openings in the switch board is directed by flaps located closely in front of the outlets. Air conducting sheets are located in the box-like dashboard carrier.

This construction presents a substantial resistance to the flowing air and provides comparatively little fresh air. The dashboard carrier occupies a large amount of space, particularly as far as its height is concerned, and in case of accidents, the flaps and the conducting sheets can injure the passengers.

An object of the present invention is to provide a simple device which will well aerate the interior of a vehicle without drafts.

Another object is to provide a physiologically correct and pleasant so-called wind cooling of passengers to which they can be exposed for a long time.

Yet another object is to provide a construction of this type wherein the required inserts of the switch board will not damage the passengers in case of accidents.

Other objects of the present invention will become apparent in the course of the following specification.

In the accomplishment of the objectives of the present invention it was found desirable to connect the air tank under the air flow with the interior of the vehicle by two conduits suitable for air flow which open into the interior by nozzles located below the edges of the dashboard cover which project into the interior. Due to this construction, a great deal of air flows from the air tank into the interior. The nozzles and the lower edges of the dashboard cover are so shaped, while using the so-called Coanda effect, that the air flow is directed in such manner that a quickly flowing air current will not strike exposed parts of the body, such as the head, the hands, the neck and the throat of the driver and his companion; thus sensitive parts of the human body are not subjected to the unpleasant feeling of local excessive cooling.

Furthermore, the curved portion with which the dashboard goes over into the lower part of the nozzle, diminishes the danger of injury by the switch board in case of an accident, since the extending edge of the dashboard cover which can be suitably shaped, will then lie upon the curved portion so that the impact is received upon a comparatively large rounded surface with specifically smaller surface pressure.

A convex rounding of the extending edge of the dashboard cover can be joined to the nozzle at the outlet of the flow conducting conduit into the interior of the vehicle. Then the air current flowing through the nozzles into the interior is deflected after leaving the outlet by the convex rounding of the dashboard cover and gets a direction which will have no disturbing effect upon the passengers. Furthermore, the stream will be widened in known manner after leaving the nozzle, it will slow up and will move through the interior of the vehicle with slower speed. Air will so flow through the interior that it will not be necessary any more to use open windows which transmit disturbing sounds and cause uncontrollable flow directions and eddies. The construction and arrangement of conduits which facilitate the flow and the provision of slots for the passage of air in the air tank at the location of the greatest dynamic pressure in the car body make it possible to eliminate the use of ventilating blowers. Thus the present invention produces a more simple construction and eliminates disturbing sounds produced by ventilating blowers which can be regulated only with difficulty. On the other hand, if a blower is used, the described nozzle arrangement makes possible the airing of the interior even when the vehicle is standing still.

Close to the steering wheel, that is in front of the driver, the outlet of the nozzle can be followed, preferably within the range of the armatures, by a concave round portion of the roof-like projecting dashboard cover having a retractile edge close to the nozzle opening. Thus the rounded portion of the instruments carrier will guide the air current downwardly to the necessary extent, namely in the direction toward the body of the driver. This edge with adjacent concave round portion also improves the view of the armatures.

Thus a further feature of the present invention is the provision of nozzles of a flow conducting conduit which are directed toward the interior of the vehicle and which are located below the roof-like horizontal edge of the dashboard cover projecting into the interior above the instruments and portions of the edge which are rounded downwardly and which join it from both sides. The air current flows around the steering wheel and around the dressed top part of the body of the driver without touching his hands with an unpleasant sensation and without penetrating through his shirt sleeves around the wrists and the arms. The neck, the throat and the face of the driver are also located outside of the range of the high speed air current.

Thus the present invention supplies air throughout the entire width of the vehicle and without draft in a physiologically proper manner to the driver and the person sitting next to him.

The nozzles, the cross sections of their openings and their outflow directions provide a form of air stream and a distribution of its speed which are suitable for the endurance, comfort and the best so-called wind cooling of a human being.

The air inlets of the air flow conduits are higher than the nozzles at the ends of the conduits in the interior of the vehicle and these nozzles are wider than the inlets. Thus each inlet can be tightly closed by a single simple flap. The air currents can be regulated by varying their cross sections, although they enter the interior substantially along the entire width of the dashboard. Furthermore, the nozzles can be arranged in two rows and the flaps can be so independently mounted that the air current directed toward the driver can be regulated independently of the air current directed to the person sitting next to him.

The upper part of the conduit can be integral with the dashboard cover in a particularly simple manner and two rows of nozzles can be connected by separate air flow conduits with the air tank.

The two rows of nozzles are preferably distributed over the entire width of the dashboard and they transmit a large amount of air into the interior of the vehicle without draft. In case of accidents, there are no curved sheets, flaps or other parts with sharp edges which could be struck by the passengers.

Furthermore, the two flow carrying conduits can be arranged below a conduit extending along the foot of the windshield and directing air into frost removing nozzles of the windshield and side windows. The lower portions of the two conduits can be component parts of the dashboard carrier.

Parts of the dashboard cover can also constitute intermediate walls between the air outflow nozzles, thus eliminating conducting sheets, frames, casings or other parts heretofore used for the outlets of the air flow.

Finally, to improve the air flow in the conduits and to provide draft-free ventilation, parts of the dashboard cover can fill out the angle behind the rear substantially vertical wall of the conduit which transmits at will fresh air or warm air.

The invention will appear more clearly from the following detailed description when taken in connection with the accompanying drawings, showing, by way of example only, a preferred embodiment of the inventive idea.

Figure 2:
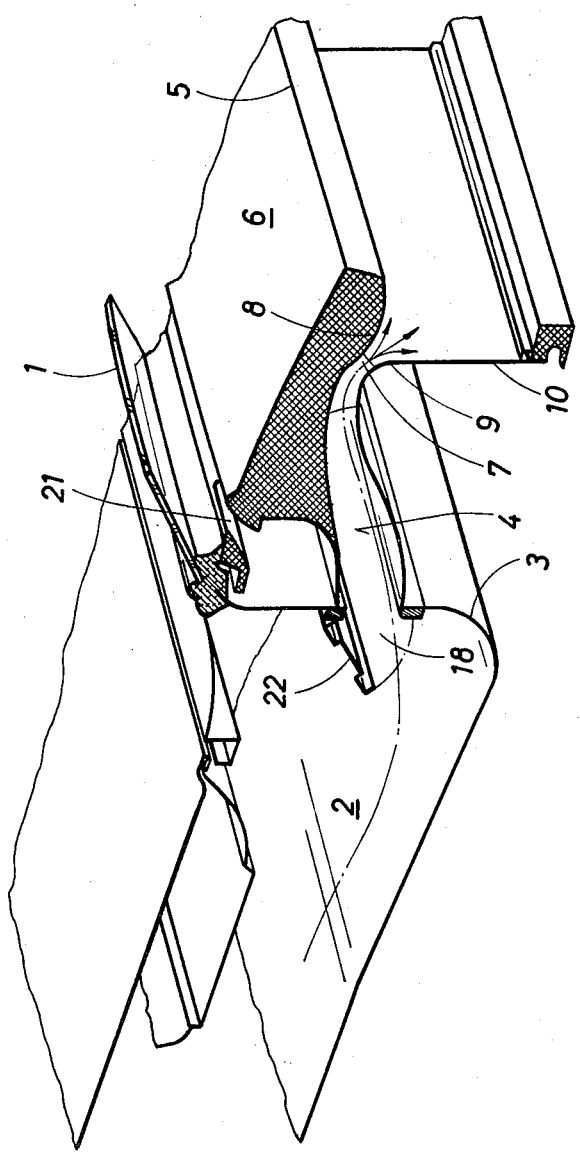

In the drawings:
FIG. 1 is a perspective view of a dashboard;
FIG. 2 is a section along the line II—II OF FIG. 1;
FIG. 3 is a section along the line III—III of FIG. 1.

FIGS. 2 and 3 of the drawings show the windshield 1 of a vehicle. An air collecting box 2 is located in front of the windshield and is connected rearwardly with the dashboard carrier 3. An air flow conduit 4 (FIG. 2) connects the box 2 with the interior of the vehicle. The conduit 4 extends below the edge 5 of the dashboard cover 6 which projects into the interior. The conduit 4 opens into the interior with a nozzle 7. A convex rounded portion 8 of the edge 5 of the dashboard cover 6 is located close to the nozzle 7. At the bottom the nozzle 7 has a round portion 9 integral with the dashboard 10. Within the range of the steering wheel above the speedometer and the clock, the dashboard cover extends like a roof over the plane of the dashboard and has a horizontal edge 11 extending into the interior of the vehicle (FIG. 3). Parts 12 and 13 have rounded edges joining the edge 11 from below on both sides (FIG. 1).

Another air flow conduit 14 (FIG. 3) has a nozzle 15 located below the edge 11. Frames and discs of armatures, such as those of the speedometer are located below the nozzle 15. The upper part of the nozzle 15 has a concave rounded portion 16 with a sharp edge 17. The air inlet openings 18 and 19 and the air flow conduits 4 and 14 (FIG. 2 and 3) are located lower than the outlet nozzles 7 and 15 provided at the ends of the conduits 4 and 14 and facing the interior of the vehicle. The outlet nozzles 7 and 15 are also wider than the air inlet openings 18 and 19.

The dashboard cover 6 constitutes the upper portion of conduits 4 and 14. The two conduits 4 and 14 are located below a conduit 20 which extends along the base of the windshield. The conduit 20 has defrosting nozzles 21 for the windshield 1. The lower portions of the two conduits 4 and 14 are parts of the dashboard carrier 3. Parts of the switch board cover 6 form intermediate walls between the outlet nozzles 7 and 15.

Angularly adjustable flaps 22 and 23 are used for closing the air inlet openings 18 and 19.

I claim:
1. In a motor vehicle having a plenum chamber, a dashboard and a substantially horizontal dashboard cover having an edge extending into the interior of the vehicle, a device for supplying air to the interior of the vehicle, said device comprising two air conducting conduits, each of said conduits having an end constituting an inlet communicating with said chamber and an opposite end having the shape of a nozzle opening into the interior of the vehicle, said edge having a convex rounded portion extending close to a nozzle of one of said conduits, said dashboard cover having an upwardly extending roof-like portion having a horizontal edge extending toward the interior of the vehicle and curved downwardly extending side edges on opposite sides of said horizontal edge, the nozzle of the other one of said conduits being located directly below said horizontal edge, said motor vehicle having an instrument frame having a rounded portion constituting a part of the nozzle of the other one of said conduits, said horizontal edge having a concave rounded portion and a sharp edge adjacent said rounded portion.

* * * * *